United States Patent
Allen et al.

(10) Patent No.: US 10,356,025 B2
(45) Date of Patent: Jul. 16, 2019

(54) IDENTIFYING AND SPLITTING PARTICIPANTS INTO SUB-GROUPS IN MULTI-PERSON DIALOGUES

(71) Applicant: International Business Machines Corporation, Armonk, NY (US)

(72) Inventors: Corville O. Allen, Morrisville, NC (US); Xavier R. Dharmaiyan, Cary, NC (US); Alexander T. Scheideler, Cary, NC (US); Kathleen M. Wassell, Raleigh, NC (US); Roshane Williams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 15/221,013

(22) Filed: Jul. 27, 2016

(65) Prior Publication Data
US 2018/0034756 A1   Feb. 1, 2018

(51) Int. Cl.
*G06F 15/16* (2006.01)
*H04L 12/58* (2006.01)

(52) U.S. Cl.
CPC .............. *H04L 51/12* (2013.01); *H04L 51/04* (2013.01)

(58) Field of Classification Search
CPC .............................................. G06F 17/30705
See application file for complete search history.

(56) References Cited

U.S. PATENT DOCUMENTS

| | | | |
|---|---|---|---|
| 6,104,989 A | 8/2000 | Kanevsky et al. | |
| 8,484,040 B2 | 7/2013 | Ashour et al. | |
| 8,606,721 B1 | 12/2013 | Dicker | |
| 10,108,674 B1* | 10/2018 | Kolcz | G06F 16/9535 |
| 2003/0131055 A1 | 7/2003 | Yashchin et al. | |
| 2004/0181580 A1* | 9/2004 | Baranshamaje | G06Q 10/107 709/206 |
| 2007/0135099 A1* | 6/2007 | Taylor | G06F 17/3089 455/412.1 |
| 2008/0183832 A1 | 7/2008 | Kirkland et al. | |
| 2010/0017483 A1 | 1/2010 | Estrada | |
| 2010/0161369 A1 | 6/2010 | Farrell et al. | |
| 2011/0196932 A1* | 8/2011 | Jackson | G06Q 10/107 709/206 |
| 2011/0246463 A1* | 10/2011 | Carson, Jr. | G06F 17/30705 707/737 |
| 2013/0166280 A1* | 6/2013 | Quast | G06F 17/241 704/9 |
| 2013/0275429 A1* | 10/2013 | York | G06F 17/30029 707/737 |

(Continued)

OTHER PUBLICATIONS

Smarty, Internet Marketing Ninjas Blog, Feb. 8, 2016, 7 pages. (Year: 2016).*

(Continued)

*Primary Examiner* — Hieu T Hoang
(74) *Attorney, Agent, or Firm* — VanLeeuwen & VanLeeuwen; Dinna R Gerhardt (57) ABSTRACT

An approach is provided that transmits electronic messages between users over a computer network, with the electronic messages being directed to a common storage area on each of the devices utilized by the users. The process identifies a number of topics corresponding to the electronic messages, with the identifying being performed by analyzing text of the electronic messages using natural language processing (NLP) techniques. The approach displays the topics at the device displays that are being utilized by the users.

15 Claims, 8 Drawing Sheets

(56) References Cited

U.S. PATENT DOCUMENTS

| | | | | |
|---|---|---|---|---|
| 2014/0006531 | A1* | 1/2014 | Sakiyama | H04L 51/00 709/206 |
| 2014/0229408 | A1 | 8/2014 | Vijayaraghavan et al. | |
| 2014/0250177 | A1* | 9/2014 | Sohn | G06F 16/9535 709/204 |
| 2015/0178373 | A1 | 6/2015 | Smith et al. | |
| 2016/0065519 | A1* | 3/2016 | Waltermann | H04L 51/16 709/206 |
| 2016/0080303 | A1* | 3/2016 | Deolalikar | G06Q 10/107 709/206 |
| 2016/0092551 | A1* | 3/2016 | Tang | H04L 51/32 707/740 |
| 2016/0162913 | A1* | 6/2016 | Linden | G06Q 30/0202 705/7.31 |
| 2017/0032470 | A1* | 2/2017 | Watanachote | G06Q 50/01 |
| 2017/0310623 | A1* | 10/2017 | Sjolander | H04L 51/16 |

OTHER PUBLICATIONS

Hassan et al., "Detecting Subgroups in Online Discussions by Modeling Positive and Negative Relations among Participants," Proceedings of the 2012 Joint Conference on Empirical Methods in Natural Language Processing and Computational Natural Language Learning, pp. 59-70, Jeju Island, Korea, Jul. 12-14, 2012.

Abu-Jbara, "Subgroup Detector : A System for Detecting Subgroups in Online Discussions," Proceedings of the 50th Annual Meeting of the Association for Computational Linguistics, pp. 133-138, Jeju, Republic of Korea, Jul. 8-14, 2012.

Adams, "Conversation Thread Extraction and Topic Detection in Text-Based Chat," Submitted in partial fulfillment of the requirements for the degree of Master of Science in Computer Science from the Naval Postgraduate School, Monterey, California, Sep. 2008, 191 pages.

Anwar et al., "A Social Graph Based Text Mining Framework for Chat Log Investigation," Digital Investigation, vol. 11, Issue 4, pre-print submitted Aug. 2014, published Dec. 2014, 15 pages.

Khan et al., "Mining Chat-room Conversations for Social and Semantic Interactions," 2002, 10 pages.

Ramachandran et al., "Mining Chat Conversations: The Next Frontier," Proceedings of the Twenty-Fourth International Florida Artificial Intelligence Research Society Conference, May 2011, Palm Beach, Florida, pp. 357-358.

* cited by examiner

IDENTIFYING AND SPLITTING PARTICIPANTS INTO SUB-GROUPS IN MULTI-PERSON DIALOGUES

BACKGROUND OF THE INVENTION

Technical Field

This disclosure relates to dynamically moving participants of multi-person dialogs into topical sub-groups.

Description of Related Art

Multi-person Instant Message chats often become very crowded with different conversation topics. Some participants on the chat session may discuss one topic of interest amongst themselves, while another group of participants discuss a separate topic. Simultaneous discussions on different topics lead to confusion and ambiguity. Because chat topics are intermingled, participants have to read all messages, resolve any ambiguous text, and determine which messages are relevant to their interests. Information that is incorrectly understood gets lost in the chat background, and users experience decreased productivity because of the time required to examine older messages on unimportant topics.

SUMMARY

An approach is provided that transmits electronic messages between users over a computer network, with the electronic messages being directed to a common storage area on each of the devices utilized by the users. The process identifies a number of topics corresponding to the electronic messages, with the identifying being performed by analyzing text of the electronic messages using natural language processing (NLP) techniques. The approach displays the topics at the device displays that are being utilized by the users.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-8 system to automatically detect topics discussed among participants of an electronic chat, referred to herein as electronic messages, and segregate the single chat into multiple chats. In one embodiment, the chat sessions are segregated by topic to decrease topic ambiguity and increase users' overall productivity. The core idea of this approach is to identify sub-groups of users, or topics, in a multi-person dialogue (chat), then perform a segregation of the users based on their natural language statements, the interaction model with other participants and the relevance of the statements to each individual. The segregation moves a set of electronic messages to a separate topic, or stream, allowing for a better mode of analysis or discussion along germane topics or people. The approach uses natural language processing (NLP) techniques to extract natural language characteristics from the text in the chat and correlates similar statements across other messages found in the dialog.

In one embodiment, the method analyzes the person-to-person interactions within the aligned statements including the direction of the references for person to person to create features. The system utilizes a sentence structure and names of individuals to characterize relevant interaction mentions from general mentions of a person. The temporal distance of the messages between participants generate features are also scored. In one embodiment, the various topics are highlighted based upon the topics' relevance to the user that is displaying the electronic message dialog. For example, the topics can be highlighted based on whether the user was the originator of the topic, has been a contributor of the topic, or whether the topic is a relatively new topic to the electronic messaging dialog. In a further embodiment, the topics can be filtered and sorted based on user preferences, such as sorting topics to which the user has been a contributor towards the top of the display, filtering out stale or older topics, and the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
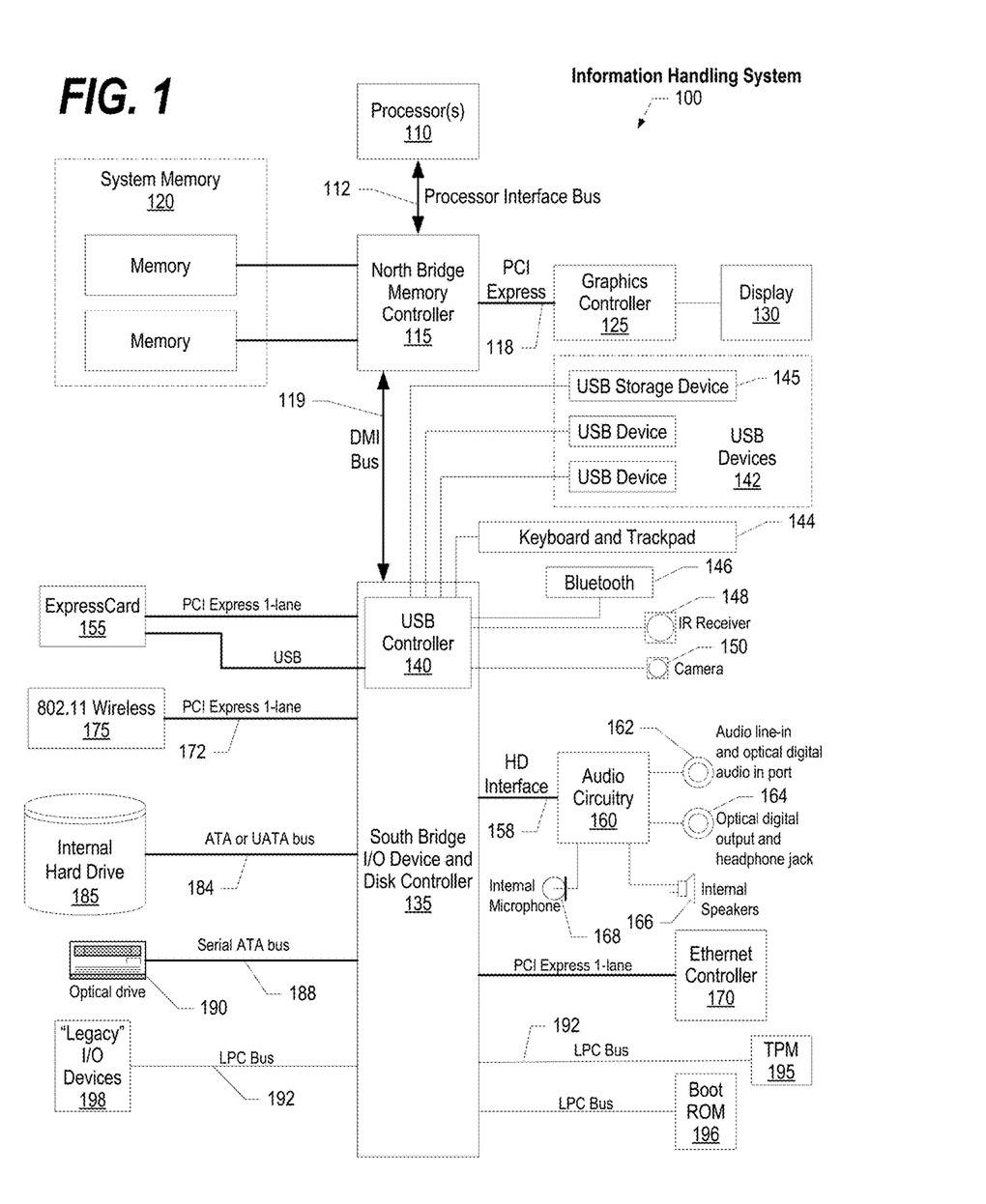
FIG. 1 depicts a block diagram of a processor and components of an information handling system.
Figure 2:
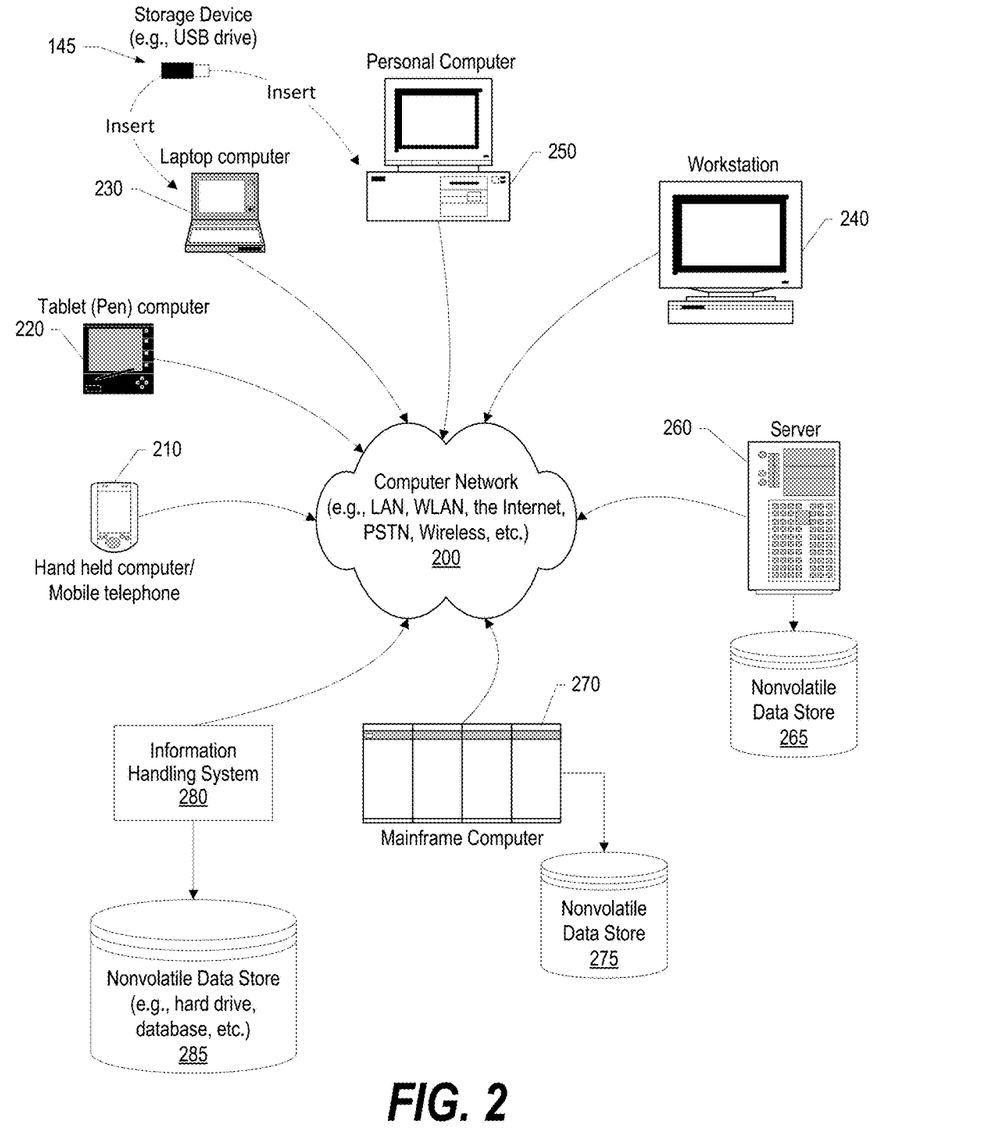
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE . 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
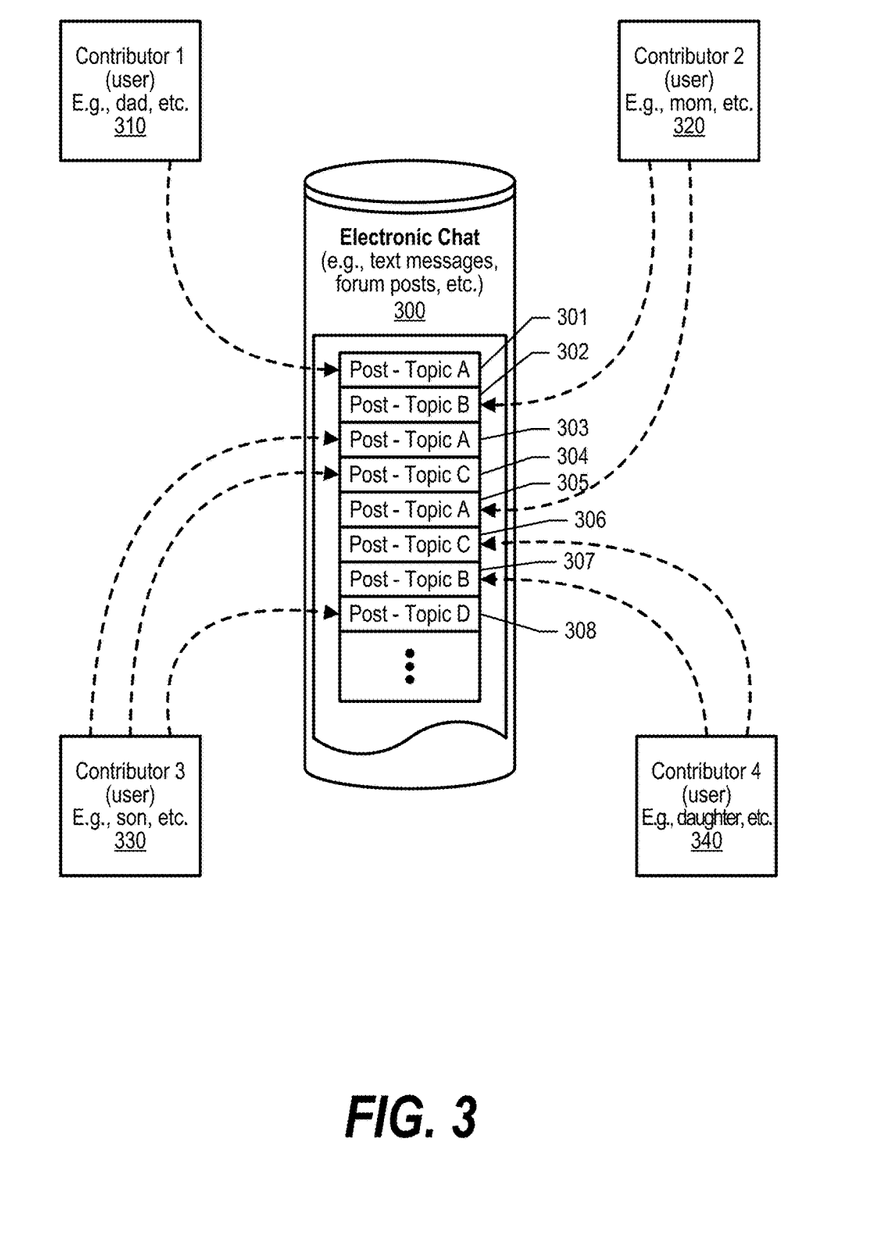
FIG. 3 is a diagram system interaction diagram depicting interaction between electronic message contributors and an electronic chat system.

FIG. 3 is a diagram system interaction diagram depicting interaction between electronic message contributors and an electronic chat system. Electronic message dialog 300 shows a number of electronic messages that have been transmitted between any number of users in a chat group. Dialog 300 is stored in a common storage area on each of the devices used by the users in the chat group. In the example shown, various messages are shown between members of a family (mom, dad, daughter, and son). Based on the context, or topic, of the message, the contents may only be of interest to certain members of the family, but rather than setting up many different dialogs between all permutations of the family members, the users create dynamic, topic-oriented, sub-groups automatically based on the topic.

As shown, the various users (dad 310, mom 320, son 330, and daughter 340) are conversing about a variety of topics with individual messages 301 through 308. However, four different topics are currently being discussed (A through D) with D being a new topic that has just recently been initiated. Rather than having to sift through all of the messages to find messages of importance to a particular user, the processes described herein automatically identify the various topics of conversation and provide a user interface that provides a topical view of the conversations, rather than a detailed list of each message with little to no context for the individual messages.

Figure 4:
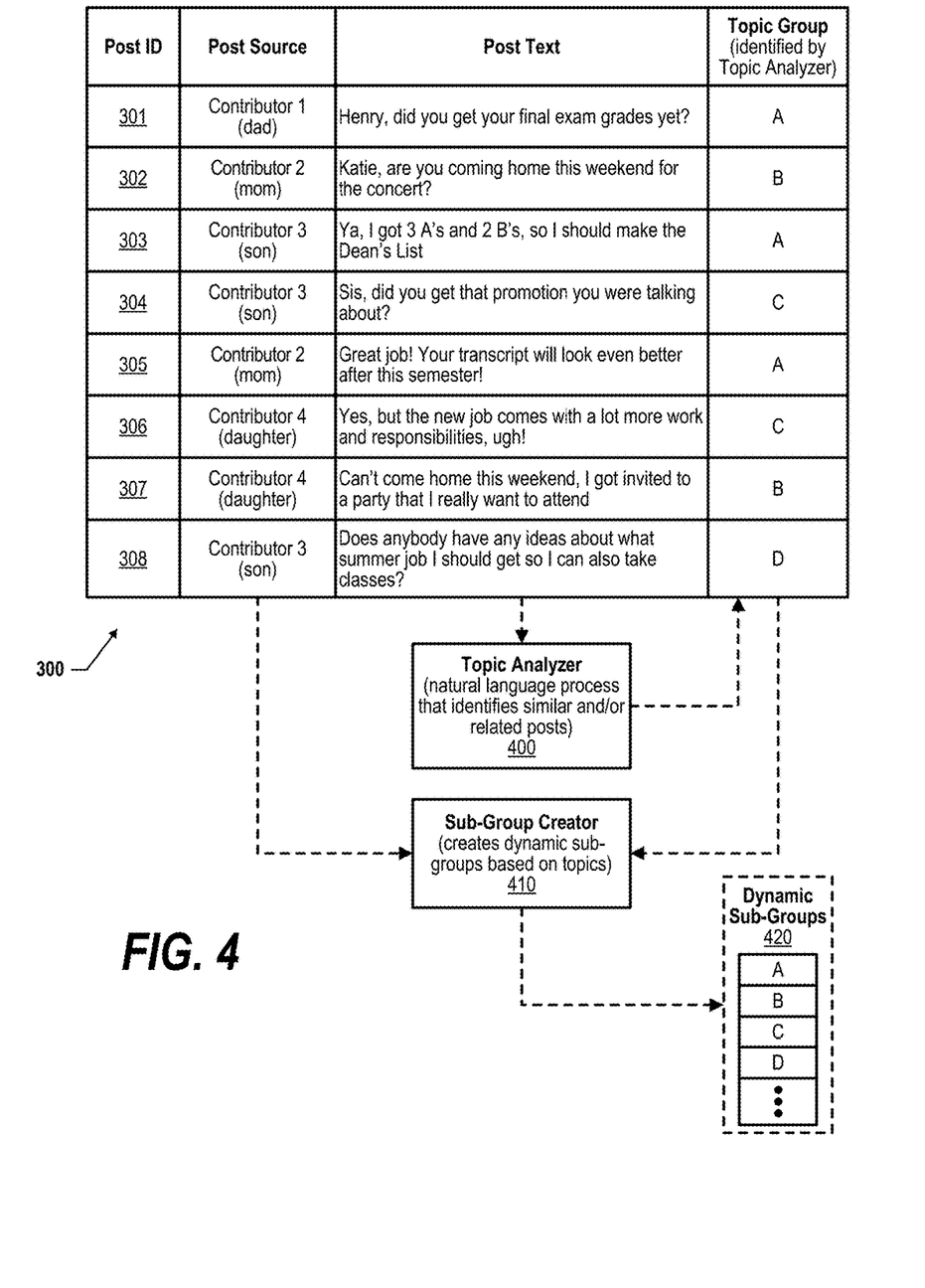
FIG. 4 is a diagram depicting functions of the topic analyzer and sub-group creator.

FIG. 4 is a diagram depicting functions of the topic analyzer and sub-group creator. Electronic message dialog 300 is shown with detail regarding the individual messages. Topic 'A' centers around discussions between the parents and the son regarding the son's grades at school, topic 'B' centers around discussions with the daughter about weekend plans, topic 'C' centers around a possible job promotion for the daughter, and topic 'D' is a newly created topic (new message with a topic that does not fit in any of the existing topics) that centers around the son's search for summer job possibilities. Each of the messages might not be important to each of the users. However, with a standard dialog viewer, each viewer (user) would see all of the messages regardless of the importance or relevance to the individual user.

To address the standard dialog viewer shortcomings, the processes described herein perform topic analyzer function 400 that uses natural language processing (NLP) techniques to identify topics of individual electronic messages and group the various messages into topics (e.g., topics A through D, etc.). Sub-group creator 410 creates a visible topical dialog that groups messages regarding a particular topic and forms dynamic sub-groups 420. As will be shown in greater detail below, the user can now select a topic of interest in order to view and respond to messages regarding a particular topic.

Figure 5:
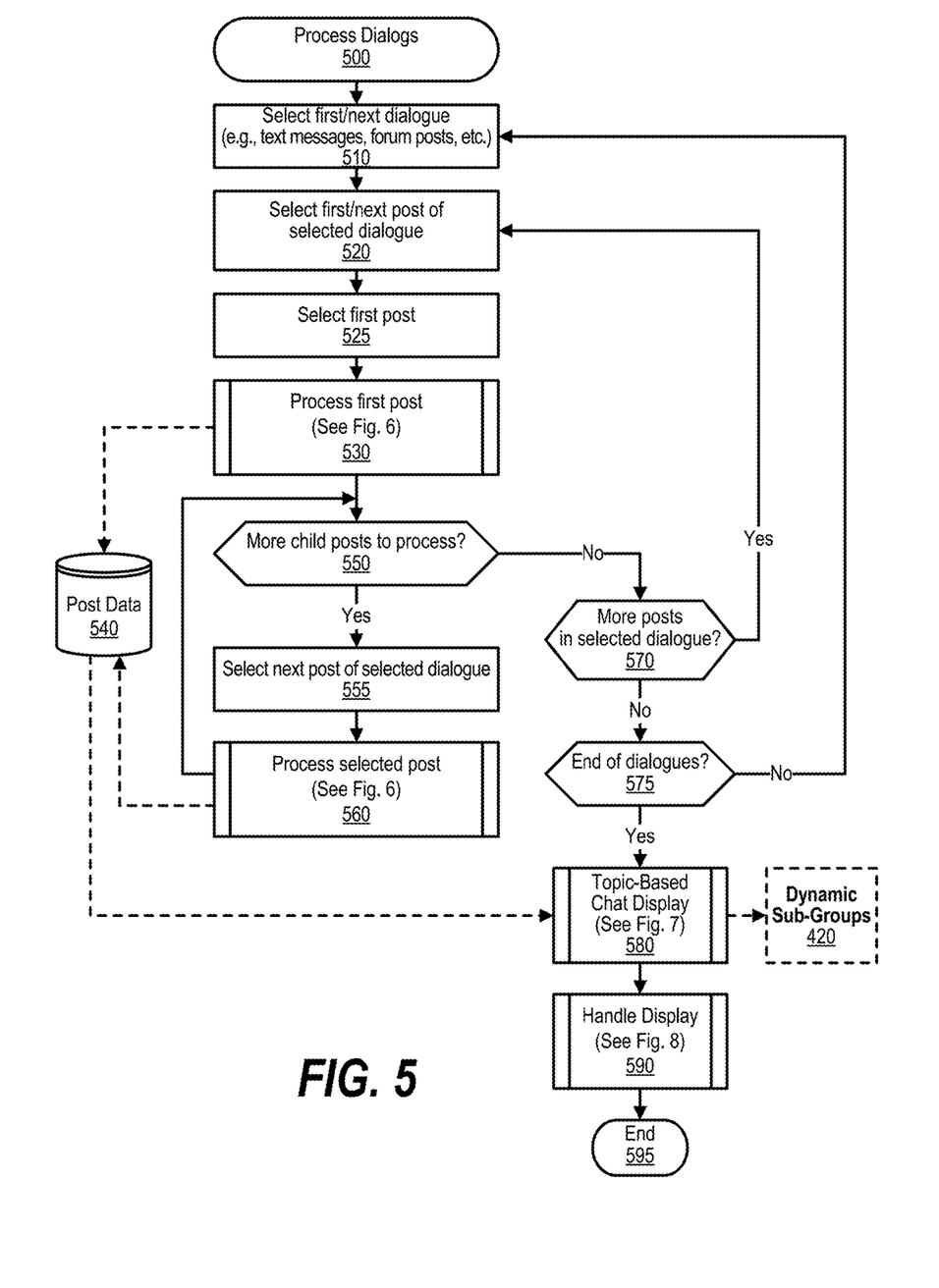
FIG. 5 is a flowchart showing steps taken to process dialogs found in electronic messaging systems.

FIG. 5 is a flowchart showing steps taken to process dialogs found in electronic messaging systems. FIG. 5 processing commences at 500 and shows the steps taken by a process that process electronic message dialogs to create a topical-based viewer. At step 510, the process selects the first dialogue (e.g., text messages, forum posts, etc.). At step 520, the process selects the first post, or message, from the selected dialogue. At step 525, the process selects first post, and, at predefined process 530, the process performs the process first post routine (see FIG. 6 and corresponding text for processing details). The data resulting from the process first post routine is stored in data store 540.

The process determines as to whether there are child posts to process in the selected dialog (decision 550). If there are child posts to process in the selected dialog, then decision 550 branches to the 'yes' branch to loop through the child posts in the dialog using step 555 and predefined process 560. This looping continues until all of the child posts in the selected dialog have been processed, at which point decision 550 branches to the 'no' branch exiting the loop. At step 555, the process selects the next (child) post of selected dialog. At predefined process 560, the process performs the process selected post routine (see FIG. 6 and corresponding text for processing details) to process the selected child post and store the child post data in data store 540.

The process determines as to whether there are more posts in the selected dialog to process (decision 570). If there are more posts in the selected dialog to process, then decision 570 branches to the 'yes' branch which loops back to step 520 to select the next post in the dialog. This looping continues until there are no more posts to process from the selected dialog, at which point decision 570 branches to the 'no' branch exiting the loop. The process next determines as to whether the end of the dialogs on the user's device has been reached (decision 575). If the end of the dialogs on the user's device has been reached, then decision 575 branches to the 'yes' branch exiting the loop. On the other hand, if there are more dialog to process, then decision 575 branches to the 'no' branch which loops back to step 510 to select and process the next dialog from the user's device as described above.

Figure 7:
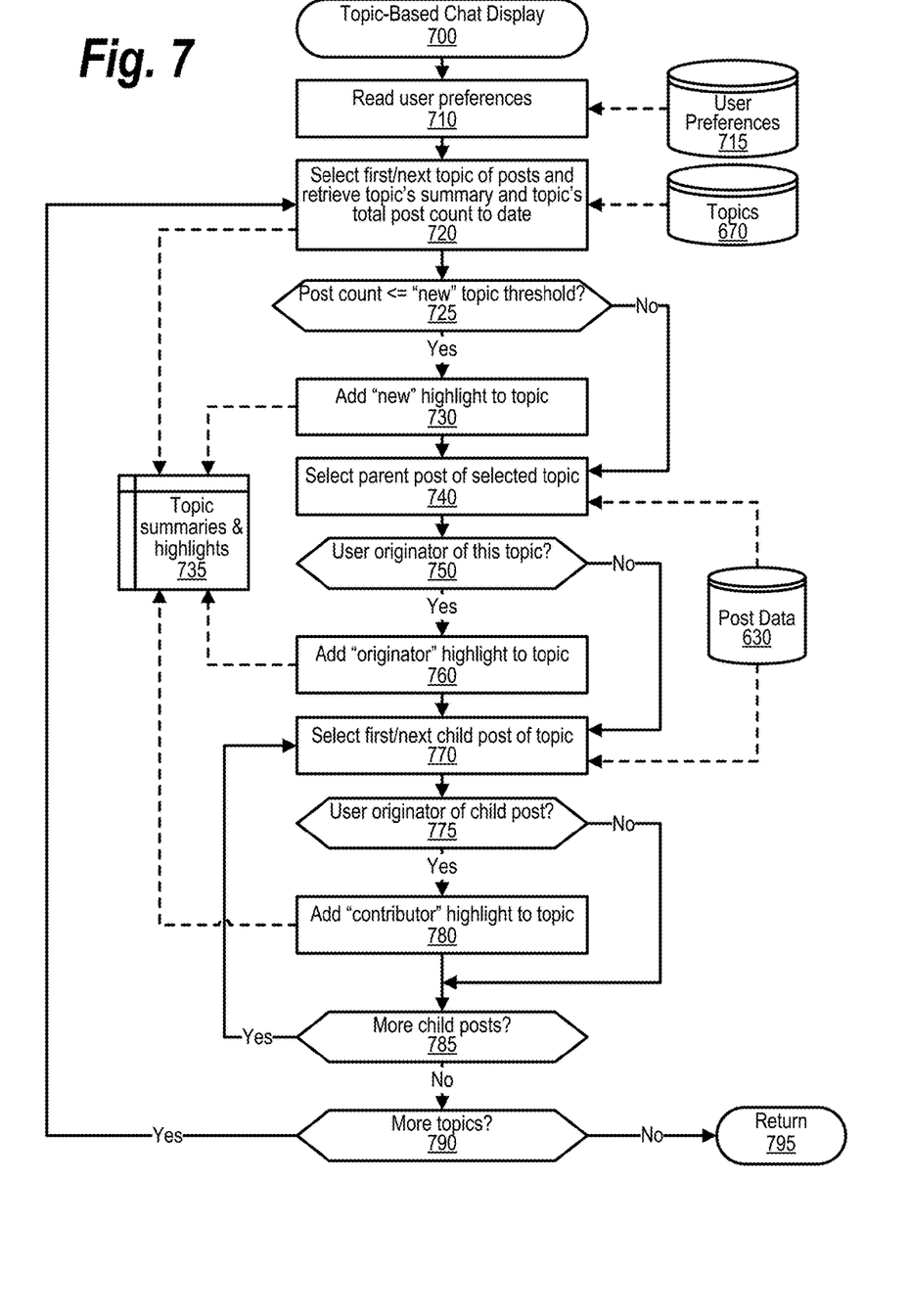
FIG. 7 is a flowchart showing steps that use the post processing to create topic summaries and highlights.

At predefined process 580, the process performs the topic-based chat display routine (see FIG. 7 and corresponding text for processing details). This routine automatically assigns the individual posts (messages) to topics and groups messages of the same topic. At predefined process 590, the process performs the handle display routine (see FIG. 8 and corresponding text for processing details). This routine manages the topical-based user interface displayed on the user's device. FIG. 5 processing thereafter ends at 595.

Figure 6:
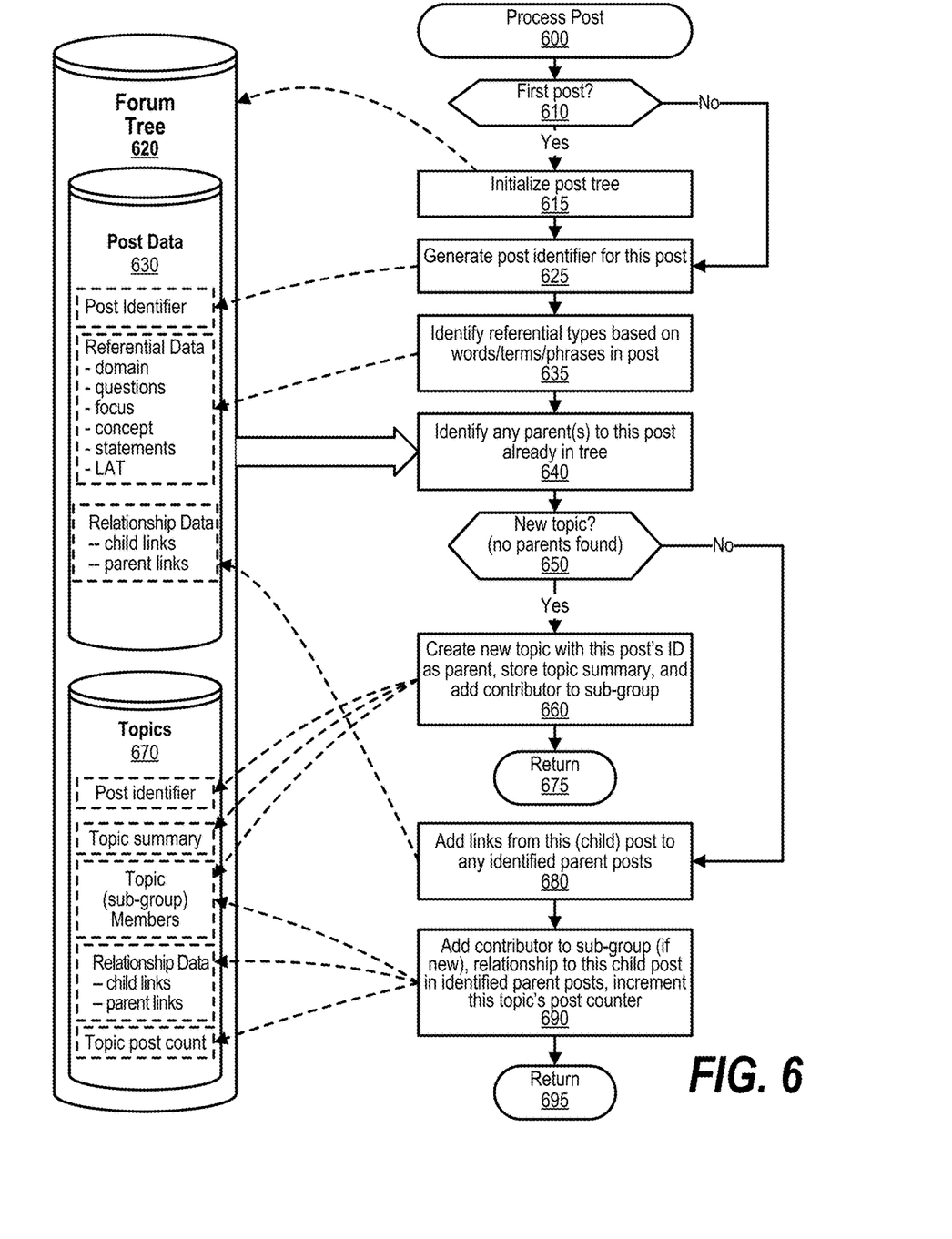
FIG. 6 is a flowchart showing steps taken to process a given post found in a dialog and create new topics and add posts to existing topics.

FIG. 6 is a flowchart showing steps taken to process a given post found in a dialog and create new topics and add posts to existing topics. FIG. 6 processing commences at 600 and shows the steps taken when processing a post retrieved from an electronic message dialog. The process determines as to whether the post being processed is the first post of the dialog (decision 610). If the post being processed is the first post of the dialog, then decision 610 branches to the 'yes' branch to perform step 615. On the other hand, if the post being processed is not the first post of the dialog, then decision 610 branches to the 'no' branch bypassing step 615. At step 615, the process initializes post tree 620 that is used to store data from electronic messages processed from the electronic message dialog. At step 625, the process generates a post identifier for the post and adds post data 630 to the post tree with the post data being initialized to store the newly generated post identifier.

At step 635, the process identifies referential types based on words, terms, and phrases in post. As shown, referential data can include the domain of the electronic message, the question or questions posed in the electronic message, the focus of the electronic message, the concept of the electronic message, statements included in the electronic message, and the lexical answer type (LAT) of any question posed in the electronic message. At step 640, the process identifies any electronic messages that are parents to this electronic message with the parent messages already existing in the post tree.

The process next determines whether the topic, as defined by the referential data, is new topic to the electronic message dialog (decision 650). If the topic is a new topic, then decision 650 branches to the 'yes' branch to perform step 660. On the other hand, if the topic already exists in post tree 620, then decision 650 branches to the 'no' branch to perform steps 680 and 690. At step 660, the process creates a new topic with this post's identifier as the parent message of the topic. The process further stores the topic summary as defined by the referential data, and adds the user that posted the electronic message as a contributor to the topic as well as being the creator of the topic. FIG. 6 processing thereafter returns to the calling routine (see FIG. 5) at 675.

If the electronic message is not a new message, then steps 680 and 690 are performed. At step 680, the process adds links from this "child" post to any identified parent posts as well as adding links from any identified parent posts back to this child post. The links are added to post data store 630. At step 690, the process adds the user that posted this electronic message as a contributor to this topic (if such user has not already been included as a contributor). Step 690 further adds a relationship link to this child post in identified any identified parent posts, and increments this topic's post counter that keeps track of the number of electronic messages that are in this topic. FIG. 6 processing thereafter returns to the calling routine (see FIG. 5) at 695.

FIG. 7 is a flowchart showing steps that use the post processing to create topic summaries and highlights. FIG. 7 processing commences at 700 and shows the steps taken by a process that performs a topic-based chat display that creates topic summaries and adds appropriate highlights to topics in a dialog. At step 710, the process reads the user's preferences from data store 715. At step 720, the process selects the first topic of electronic messages and also retrieves the topic's summary and the topic's current total electronic message count to date. The topic summary and message count are stored in memory area 735.

The process determines as to whether the current number of electronic messages in the selected topic is lower than a given threshold that defines the number of messages in topics considered "new" (decision 725). If the current number of electronic messages in the selected topic is lower than the threshold, then decision 725 branches to the 'yes' branch to perform step 730. On the other hand, if the current number of electronic messages in the selected topic is not lower than the threshold, then decision 725 branches to the 'no' branch bypassing step 730. In one embodiment, an amount of time threshold can be applied either in conjunction with the message count threshold or in lieu of the message count threshold so that only topics that have been started within a certain amount of time (e.g., the past two days) are considered "new." At step 730, in response to the topic being considered a "new" topic the process adds "new" highlight to topic and stores the new topic tag in memory area 735.

At step 740, the process selects the parent post of selected topic, such as the initial message that started the topic. The process determines as to whether this user is the originator of this topic (decision 750). If this user is the originator of this topic, then decision 750 branches to the 'yes' branch to perform step 760. On the other hand, this user is not the originator of this topic, then decision 750 branches to the 'no' branch bypassing step 760. At step 760, the process adds an "originator" highlight to topic and stores the originator topic tag in memory area 735.

At step 770, the process selects the first child post of topic. The process determines as whether this user is the originator (author) of the selected child post (decision 775). If this user is the originator of the selected child post, then decision 775 branches to the 'yes' branch to perform step 780. On the other hand, if this user is not the originator of the selected child post, then decision 775 branches to the 'no' branch bypassing step 780. At step 780, the process adds "contributor" highlight to topic and stores the contributor topic tag in memory area 735.

The process determines as to whether there are more child posts for the selected topic (decision 785). If there are more child posts for the selected topic, then decision 785 branches to the 'yes' branch which loops back to step 770 to select and process the next child post for the topic as described above. This looping continues until all of the child posts for the topic have been processed, at which point decision 785 branches to the 'no' branch exiting the loop. The process next determines whether there are more topics in the dialog to process (decision 790). If there are more topics in the dialog to process, then decision 790 branches to the 'yes' branch which loops back to step 720 to select and process the next topic in the dialog as described above. This looping continues until all of the topics in the dialog have been processed, at which point decision 790 branches to the 'no' branch exiting the loop. FIG. 7 processing thereafter returns to the calling routine (see FIG. 5) at 795.

Figure 8:
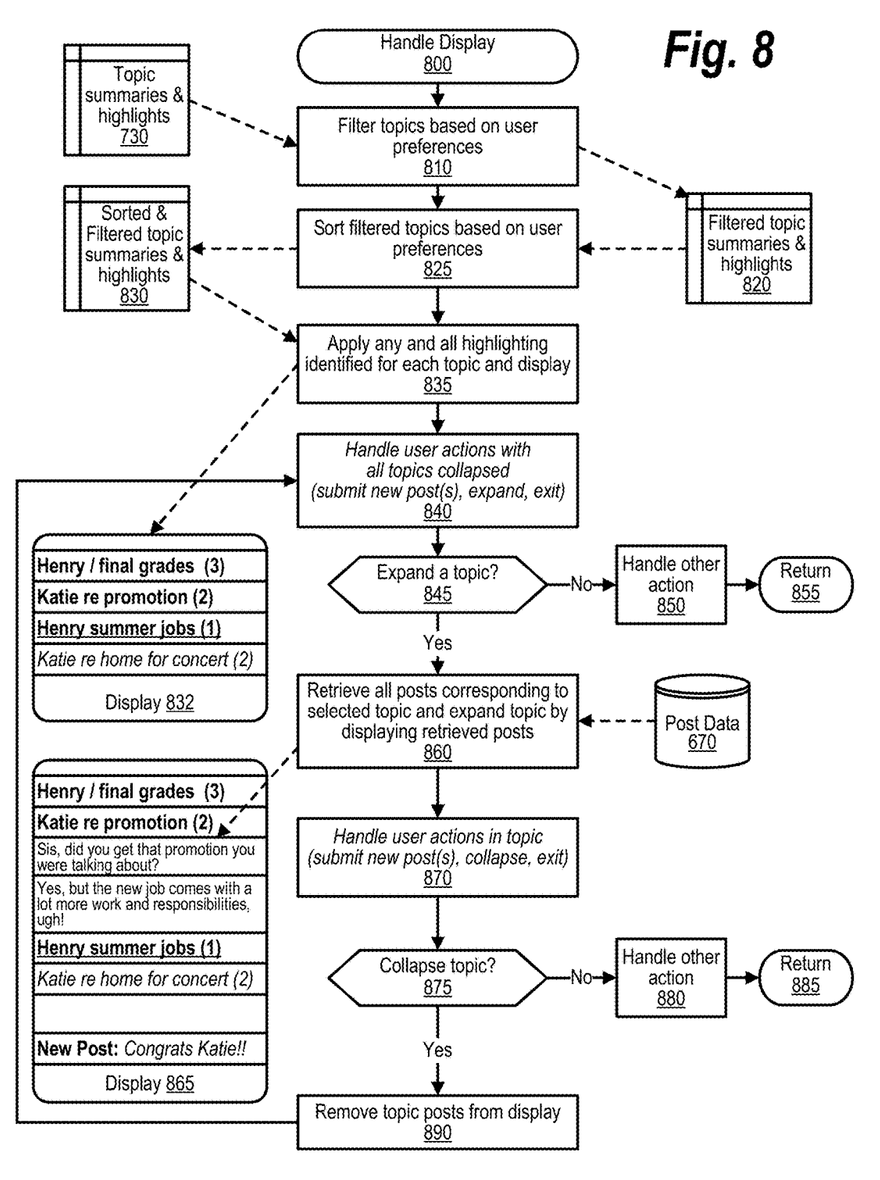
FIG. 8 is a flowchart showing steps taken to handle the electronic messaging display that incorporates topic segregation.

FIG. 8 is a flowchart showing steps taken to handle the electronic messaging display that incorporates topic segregation. FIG. 8 processing commences at 800 and shows the steps taken by a process that handle display of topics for a dialog. At step 810, the process filters the topics in the dialog based on user preferences. Step 810 retrieves the topic data from memory area 730 and stores the filtered topic summaries and corresponding highlights in memory area 820. At step 825, the process sorts the filtered topics based on user preferences and stores the filtered topic summaries and corresponding highlights in memory area 830. At step 835, the process applies any and all highlighting identified for each topic and displays the sorted, filtered topic summaries on display screen 832.

At step 840, the process handles user actions that are received with all topics being in a collapsed state (e.g., actions of submit a new post, expand a selected topic, exit the dialog, etc.). The process determines as to whether the user has requested to expand a topic (decision 845). If the user has requested to expand a topic, then decision 845 branches to the 'yes' branch to perform step 860. On the other hand, if the user has not requested to expand a topic, then decision 845 branches to the 'no' branch whereupon step 850 is performed to handle some other action (e.g., new post, exit dialog, etc.) and processing returns to the calling routine at 855.

If the user has requested to expand a topic then, at step 860, the process retrieves all electronic messages included in the selected topic and expands the selected topic by displaying all of the retrieved electronic messages. The result of expanding one of the topics is depicted in the example shown in display 865. At step 870, the process handles user actions that are received with the selected topic being in an expanded state (e.g., actions of submit a new post, expand another topic, collapse a selected topic, exit the dialog, etc.).

The process determines as to whether the user has requested to collapse a topic that is currently shown in an expanded state (decision 875). If the user has requested to collapse a topic, then decision 875 branches to the 'yes' branch to perform step 890. On the other hand, if the user has not requested to collapse a topic, then decision 875 branches to the 'no' branch whereupon step 880 is performed to handle some other action (e.g., new post, exit dialog, etc.) and processing returns to the calling routine at 885. If the user has requested to expand a topic then, at step 890, the process removes the electronic messages included in the selected topic from display the display screen. Processing then loops back to step 840 to handle further user actions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:

transmitting a plurality of electronic messages between a plurality of users, wherein the plurality of electronic messages are directed to a common storage area on a plurality of devices utilized by the plurality of users;

identifying, by a first one of the plurality of devices, a plurality of topics corresponding to the plurality of electronic messages, wherein the identifying is performed by analyzing text of the plurality of electronic messages using natural language processing (NLP) techniques, and wherein the first device is operated by a first one of the plurality of users;

in response to determining that a first one of the plurality of topics comprises an amount of messages that is greater than one and lower than a new topic threshold, assigning, by the first device, a first highlight format to the first topic; and displaying the plurality of topics on the first device, wherein the displaying comprises applying the first highlight format to the first topic.

2. The method of claim 1 further comprising:

filtering out one or more topics from the plurality of topics based on one or more user preferences of the first user, the filtering resulting in a filtered set of topics; and sorting the filtered set of topics based on a metadata associated with each of the plurality of topics.

3. The method of claim 1 further comprising:

identifying a topic summary corresponding to each of the plurality of topics by using one or more of the NLP techniques; and displaying the topic summary corresponding to each of the plurality of topics and inhibiting display of the electronic messages included in each of the plurality of topics.

4. The method of claim 3 further comprising:

receiving a selection from the first user of a selected one of the displayed topic summaries; and in response to the received selection, expanding the selected topic summary by displaying one or more of the electronic messages included in the topic corresponding to the selected topic summary.

5. The method of claim 4 further comprising:

receiving a second selection from the first user directed to the selected topic summary; and in response to the received second selection, collapsing the selected topic summary by inhibiting display of the one or more electronic messages included in the topic corresponding to the selected topic summary.

6. An information handling system comprising:

one or more processors;

a memory coupled to at least one of the processors;

a computer network that connects the information handling system to a plurality of other information handling systems, collectively forming a plurality of devices;

a display screen accessible by at least one of the processors; and a set of computer program instructions stored in the memory and executed by at least one of the processors in order to perform actions comprising:

transmitting a plurality of electronic messages between a plurality of users, wherein the plurality of electronic messages are directed to a common storage area on the plurality of devices utilized by the plurality of users;

identifying, by a first one of the plurality of devices, a plurality of topics corresponding to the plurality of electronic messages, wherein the identifying is performed by analyzing text of the plurality of electronic messages using natural language processing (NLP) techniques, and wherein the first device is operated by a first one of the plurality of users;

in response to determining that a first one of the plurality of topics comprises an amount of messages that is greater than one and lower than a new topic threshold, assigning, by the first device, a first highlight format to the first topic; and displaying the plurality of topics on the first device, wherein the displaying comprises applying the first highlight format to the first topic.

7. The information handling system of claim 6 wherein the actions further comprise:

filtering out one or more topics from the plurality of topics based on one or more user preferences of the first user, the filtering resulting in a filtered set of topics; and sorting the filtered set of topics based on a metadata associated with each of the plurality of topics.

8. The information handling system of claim 6 wherein the actions further comprise:

identifying a topic summary corresponding to each of the plurality of topics by using one or more of the NLP techniques; and displaying the topic summary corresponding to each of the plurality of topics and inhibiting display of the electronic messages included in each of the plurality of topics.

9. The information handling system of claim 8 wherein the actions further comprise:

receiving a selection from the first user of a selected one of the displayed topic summaries; and in response to the received selection, expanding the selected topic summary by displaying one or more of the electronic messages included in the topic corresponding to the selected topic summary.

10. The information handling system of claim 9 wherein the actions further comprise:

receiving a second selection from the first user directed to the selected topic summary; and in response to the received second selection, collapsing the selected topic summary by inhibiting display of the one or more electronic messages included in the topic corresponding to the selected topic summary.

11. A computer program product stored in a computer readable storage medium, comprising computer program code that, when executed by an information handling system, performs actions comprising:

transmitting a plurality of electronic messages between a plurality of users, wherein the plurality of electronic messages are directed to a common storage area on a plurality of devices utilized by the plurality of users;

identifying, by a first one of the plurality of devices, a plurality of topics corresponding to the plurality of electronic messages, wherein the identifying is performed by analyzing text of the plurality of electronic messages using natural language processing (NLP) techniques, and wherein the first device is operated by a first one of the plurality of users;

in response to determining that a first one of the plurality of topics comprises an amount of messages that is greater than one and lower than a new topic threshold, assigning, by the first device, a first highlight format to the first topic; and displaying the plurality of topics on the first device, wherein the displaying comprises applying the first highlight format to the first topic.

12. The computer program product of claim 11 wherein the actions further comprise:

filtering out one or more topics from the plurality of topics based on one or more user preferences of the first user, the filtering resulting in a filtered set of topics; and sorting the filtered set of topics based on a metadata associated with each of the plurality of topics.

13. The computer program product of claim 11 wherein the actions further comprise:

identifying a topic summary corresponding to each of the plurality of topics by using one or more of the NLP techniques; and displaying the topic summary corresponding to each of the plurality of topics and inhibiting display of the electronic messages included in each of the plurality of topics.

14. The computer program product of claim 13 wherein the actions further comprise:

receiving a selection from the first user of a selected one of the displayed topic summaries; and in response to the received selection, expanding the selected topic summary by displaying one or more of the electronic messages included in the topic corresponding to the selected topic summary.

15. The computer program product of claim 14 wherein the actions further comprise:

receiving a second selection from the first user directed to the selected topic summary; and in response to the received second selection, collapsing the selected topic summary by inhibiting display of the one or more electronic messages included in the topic corresponding to the selected topic summary.

* * * * *